Patented Oct. 24, 1933  1,931,542

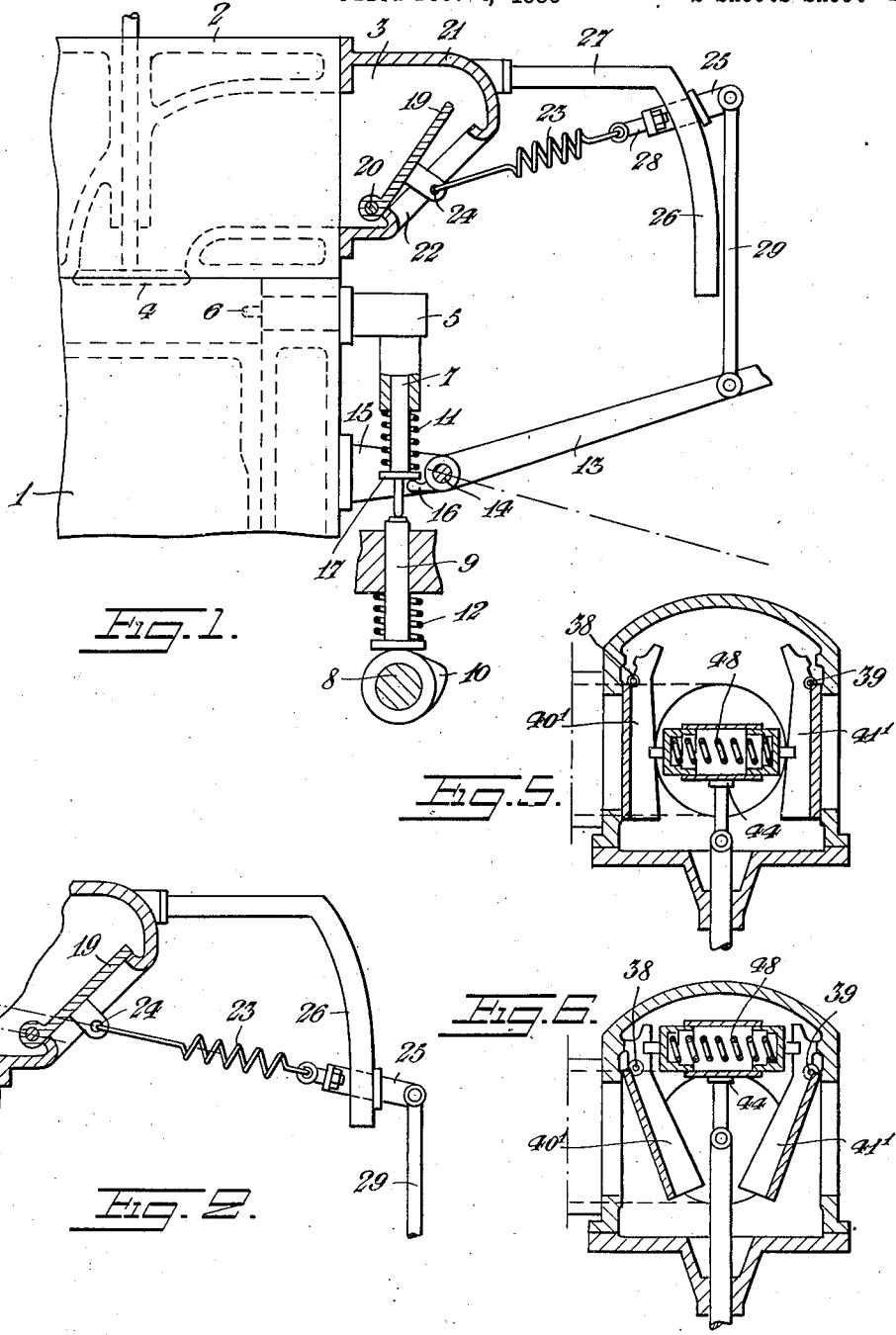

UNITED STATES PATENT OFFICE 1,931,542

INTERNAL COMBUSTION ENGINE

Knut Jonas Elias Hesselman, Saltsjo-Storangen, Sweden

Application December 4, 1930, Serial No. 499,858, and in Sweden December 9, 1929

19 Claims. (Cl. 123—139)

My invention relates to internal combustion engines and has particular reference to the type of engine operated by finely divided liquid fuel in which the liquid is supplied to the engine by means of a pump and, after mixing with air, is ignited by means of an electric igniter.

In the operation of engines of this type, it is a well established fact that most efficient combustion is secured by maintaining the ratio between the amounts of fuel and combustion air supplied to the engine under definite control. One known method of proportioning the amounts of fuel and combustion air comprises means interconnecting a throttle valve in the air inlet passage to the engine with the device employed for regulating the amount of fuel supplied to the engine by the pump, so that as the quantity of fuel supplied by the pump is decreased the throttle valve operates to restrict the air inlet passage to the engine. Such mechanism, however, provides only a partial solution to the problem, since it is effective to keep the desired ratio between fuel and combustion air only at constant or substantially constant engine speed. If the adjustment of an arrangement of the above described character is not changed and the speed of the engine varies, the consequent variation in the value of the suction produced by the engine will operate to so vary the rate at which air is drawn through the fixed throttle opening that the desired ratio between air and fuel will be disturbed. In order to overcome this difficulty, an auxiliary air regulating valve acting in response to variations in the suction produced by the engine has heretofore been employed, such valve being located between the throttle valve and the engine. In the forms of apparatus heretofore employed, the auxiliary air valve has usually been in the form of a gravity or spring loaded valve lifted against its load by air drawn through the air inlet passage.

The arrangement just described, in which a main throttle valve interconnected with the pump regulating means and an auxiliary air valve are employed, is productive of satisfactory results with respect to the maintenance of the desired ratio between air and fuel at varying engine speeds, but involves the complication of two separate air control valves, one operating in response to the adjustment of the pump regulating means and the other operating in response to variations in engine suction due to changes in engine speed.

The principal object of the present invention is to secure the desired ratio between amounts of combustion air and fuel supplied to the engine through the medium of a single air valve mechanism. This object is accomplished by providing a pivoted throttle valve so arranged as to be opened by suction produced by the engine and subjected to a torque tending to close the valve that is variable in response to changes in the position of adjustment of the means for regulating the fuel supply. Such torque will hereafter be referred to as closing torque.

The more specific nature of the invention and its more detailed objects may best be understood from the following description of the several embodiments illustrated in the accompanying drawings forming a part of this specification, in which:

Fig. 1 is an elevation partly in section of a portion of an engine illustrating one embodiment of the invention with the valve in completely open state.

Fig. 2 illustrates the valve in closed state.

Figs. 5 and 6 illustrate a modification of the embodiment shown in Figs. 3 and 4 in closed and open state, respectively.

Figure 3:
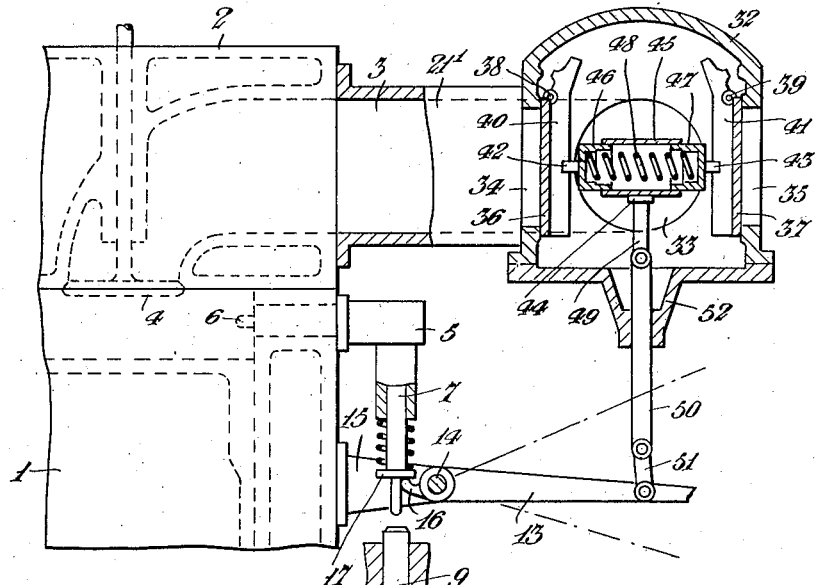
Figs. 3 and 4 are views similar to Fig. 1 and illustrate a second embodiment of the invention with the valve shown in closed and open state, respectively.

Turning now to Fig. 1, reference numeral 1 indicates part of an engine cylinder provided with a head 2, the latter having an air inlet passage 3 therein leading to the usual cylinder inlet valve 4. Mounted at the side of the cylinder is a fuel pump 5 delivering to the injection nozzle 6 and comprising a plunger 7 adapted to be operated from the cam shaft 8, which is preferably the engine cam shaft, through the medium of tappet 9. Plunger 7 is lifted on its discharge stroke by cam 10 and is returned on its suction stroke by means of spring 11. Tappet 9 is caused to follow the contour of cam 10 by the spring 12. The quantity of fuel supplied per stroke of the pump 5 is controlled by regulating the length of the suction stroke of plunger 7. This regulation of the suction stroke of the pump is accomplished by means of a regulating lever 13 pivoted at 14 to a bracket 15 fixed to the cylinder and provided with an arm 16 adapted to contact the lower face of an enlargement or collar 17 on the plunger 7.

As will be readily seen from the drawings, movement of the regulating lever 13 downward from the position shown in full lines in the figure will operate to shorten the suction stroke of the plunger and thereby reduce the quantity of fuel supplied by the pump on its ensuing discharge stroke. In the figure, the lever 13 is shown in full lines in the position permitting maximum stroke of the pump plunger while the position of the lever giving minimum stroke of the plunger is indicated by the dot and dash line 18. In this connection it is to be noted that, due to the compressibility of the fuel in the pump chamber and discharge passage leading to the injection nozzle, injection of fuel may cease before the pump stroke is reduced to zero. For a more detailed description of the above described type of pump, which I have found to be very satisfactory, reference may be had to my copending application, Serial No. 315,957, filed October 30, 1928. It is to be understood, however, that the above described pump is shown for illustrative purposes only, and that other specific forms of pump may be employed within the scope of the present invention.

The air inlet passage 3 to the engine is controlled by means of the valve 19 pivoted at 20 to the member 21, which, in the present embodiment is shown as a separate member secured to the cylinder head, but which may obviously be integral therewith. Valve 19 is adapted to be seated by gravity against a suitable seat formed around the periphery of the inlet port 22 and to be opened by engine suction. One end of a spring 23 is connected to an eye 24 on valve 19, while the other end of the spring is attached to a carrier 25, adapted to slide along an arm 26 provided by the fixed member 27. Initial adjustment of the tension of spring 23 is secured by means of the adjustable eye-bolt 28. Carrier 25 and the regulating lever 13 are connected by means of the pivoted link 29.

By reference to the figure it will be seen that with the regulating lever 13 in the position of adjustment resulting in maximum fuel supply to the engine, the projected axis of the spring 23 extends through the center of pivot 20, so that the effective moment arm through which the springs acts on the valve is, in this position of adjustment, equal to zero, and therefore the closing torque applied to the valve through the spring is also equal to zero. In this position of adjustment, that is, with the maximum quantity of fuel being supplied to the engine, it is desirable also to supply the maximum quantity of air to the engine, and to this end the uppermost portion of arm 26 is of such a curvature as to cause the spring 23 to positively open the valve completely, as soon as the carrier 25 passes a predetermined position on its upward stroke.

When the adjusting lever 13 is moved from the full line position shown to the position represented by the center line 18, the carrier 25 is moved to a position such that the spring 23 assumes the position indicated in Fig. 2. This position represents the adjustment for minimum pump stroke, and it will be seen that in this position the spring 23 exerts a closing torque on valve 19 through an effective moment arm, the length of which is indicated by the distance 31. In this position of adjustment, with the fuel supplied to the engine reduced to minimum, increased closing torque on valve 19 is desired in order to correspondingly reduce the amount of air supplied to the engine, and it will be seen that the desired increase in closing torque is provided due to the moment arm through which spring 23 acts on valve 19 when the spring is in the position shown in Fig. 2.

From the above description it will be apparent that the mechanism provided will operate to impose on valve 19 a closing torque varying in value with variations in the position of adjustment of the fuel regulating means, and will at the same time permit valve 19 to assume a position of adjustment under the influence of engine suction so as to compensate for variations in the value of engine suction due to changes in the speed of operation of the engine.

Figure 4:
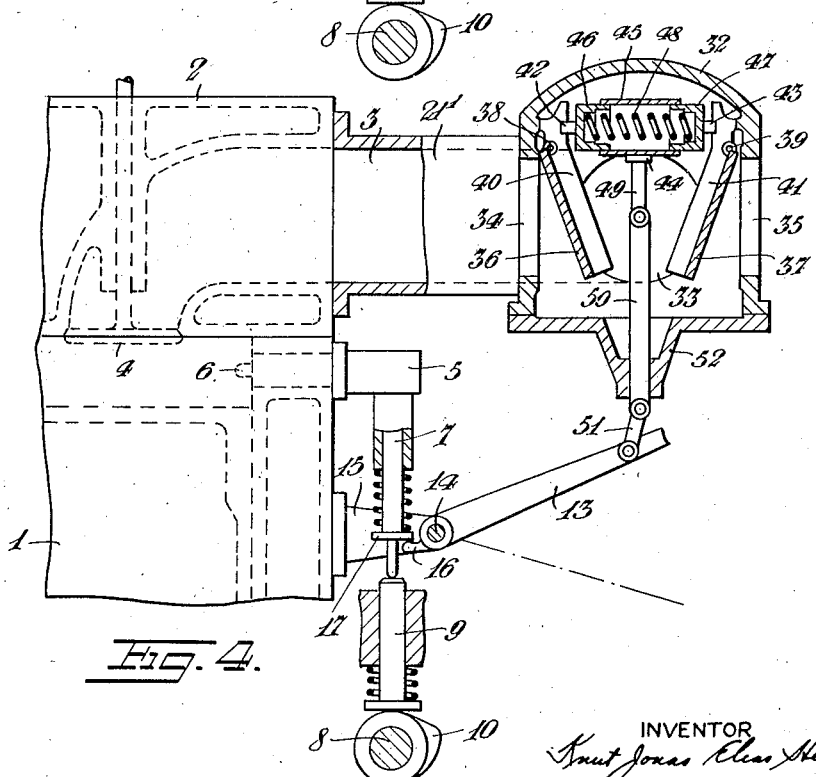

A second embodiment is illustrated in Figs. 3 and 4, this embodiment being similar to the form shown in Fig. 1 with respect to the engine cylinder, pump mechanism and means for adjusting the quantity of fuel delivered by the pump. In the present embodiment, the member 21' providing the air inlet passage 3 terminates in a valve casing 32 communicating with passage 3 by way of the port 33, and providing two inlet ports 34 and 35 communicating with the atmosphere. Ports 34 and 35 are controlled respectively by valves 36 and 37, these valves being pivoted respectively at 38 and 39. As will be seen from the figure, valves 36 and 37 tend to close under the influence of gravity and tend to open inwardly toward each other under the influence of engine suction. Valves 36 and 37 are provided respectively with guide means which may advantageously be in the form of vertical ribs 40 and 41 along which are adapted to slide the bifurcated ends 42 and 43 of a spring carrier 44 comprising the open-ended cylindrical member 45 in which are slidably mounted the spring retaining members 46 and 47. The spring 48 is disposed between the retaining members 46 and 47 and tends to maintain the bifurcated ends of said members in contact with the ribs 40 and 41. The spring retainer is connected by means of links 49, 50 and 51 to the lever 13, link 50 being mounted in a suitable guide formed in the member 52 providing the bottom closure for the valve casing 32. The guiding ribs 40 and 41 project above the pivots 38, 39 and the projecting portions of the ribs form such an angle with the valves that when the bifurcated ends 42, 43 are in engagement with said projecting portions the valves will be positively held in open state. The operation of this embodiment of the invention is similar to that of the embodiment shown in Fig. 1. With the pump regulating means adjusted as shown in Fig. 4, the spring carrier 44 is positioned so that the spring 48 will positively maintain the valves in open state, as shown in Fig. 4, the bifurcated ends 42, 43 being in engagement with the projecting portions of the ribs 40, 41. As the pump regulating lever 13 is moved downwardly to decrease the fuel supply, the spring carrier is correspondingly moved downwardly and after the bifurcated ends 42, 43 have passed the pivots 38, 39 and are further moved downwardly the spring will tend to close the valves, the moment arm through which springs 48 acts being increased so that the closing torque applied to the valves will increase successively according as the spring is lowered. It is to be noted that in the embodiment shown in Figs. 3 and 4 movement of the pump regulating means serves to alter the moment arm through which the spring acts, but does not operate with the valves in closed position, to alter the tension of the spring. This is due to the fact that the guide ribs 40 and 41 on the valves provide parallel guide surfaces for the spring carrier when the valves are in closed position.

In Figs. 5 and 6 a variation of the embodiment illustrated in Figs. 3 and 4 is shown, this variation corresponding in action to the variation illustrated in Figs. 1 and 2. In the form of apparatus illustrated in Figs. 5 and 6, the guide ribs 40' and 41' are curved so that as the spring carrier 44 is lowered from the position shown in Fig. 6 and has passed the level of the pivots 38, 39 the tension of spring 48, as well as the moment arm through which it acts, will be altered. Obviously, the spring tension may be altered in accordance with the requirements of any individual design by alteration in the form of the guide ribs between which the spring carrier is moved.

From the foregoing description it will be evident that in accordance with the present invention very exact proportioning of the quantity of combustion air supplied to the quantity of fuel supplied may be obtained through alteration of the moment arm through which the spring means acts to supply closing torque to the air regulating valve, or by concurrent alteration of the moment arm and of the tension of the spring.

It is to be noted that the initial tension of the spring should be so adjusted that with the pump regulating means set to give a pump plunger stroke equal to zero the torque due to the spring will correspond to the torque acting on the valve due to the atmospheric pressure.

It will further be evident that many different forms of apparatus may be employed for carrying the invention into effect, and the invention is to be understood as embracing all forms of apparatus included within the scope of the appended claims.

What I claim is:

1. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump and means for applying a variable closing torque, the value of which is determined by the position of the pump regulating means, to said air regulating means.

2. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump and mechanism including a spring for applying a closing torque on said air regulating means, said mechanism being movable in response to movement of the pump regulating means to vary the closing torque on the air regulating means due to said spring.

3. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump and mechanism including a spring for applying a variable closing torque to the air regulating means, said mechanism being movable in response to movement of the pump regulating means to increase the closing torque applied to the air regulating means due to said spring upon movement of the pump regulating means to decrease the quantity of fuel supplied to the engine.

4. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump, mechanism including a spring acting to apply a closing torque to the air regulating means and a member movable in response to movement of the pump regulating means for changing the position of said spring to alter the effective moment arm through which the spring acts, whereby to vary the closing torque applied to the air regulating means upon alteration of the position of the pump regulating means.

5. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump, mechanism including a spring acting to close the air regulating means, a spring carrier connected to the pump regulating means and adapted to change the position of the spring upon movement of the pump regulating means to alter the effective moment arm through which the spring acts on the air regulating means, and guide means for said carrier, said guide means operating to cause the tension of said spring to be altered as the position of the spring is changed.

6. An internal combustion engine having an inlet passage for combustion air, a fuel pump, air regulating means for controlling the flow of air through said passage comprising one or more pivoted valves adapted to be opened by engine suction, pump regulating means for controlling the amount of fuel supplied by the pump, a member forming a guide, a spring carrier movable along said guide, a spring between said carrier and said valve, said spring acting to close the valve, and means for connecting said carrier and said pump regulating means, said guide being positioned so that movement of said carrier increases the tension of said spring as the pump regulating means is adjusted to decrease the amount of fuel supplied to the engine.

7. In an internal combustion engine having an inlet passage for combustion air, a fuel pump, air regulating means for controlling the flow of air through said passage comprising two pivoted valves adapted to be opened by engine suction and opening toward each other, pump regulating means for controlling the amount of fuel supplied to the engine, mechanism for applying closing torque to the air regulating means comprising a spring and a spring carrier interposed between said valves, said carrier and spring being movable toward or away from the axes about which the valves are pivoted to decrease or increase the moment arm through which said spring acts to close the valves and means for connecting said spring carrier to the pump regulating means so that movement of the pump regulating means to decrease the amount of fuel supplied to the engine moves said spring carrier to increase the moment arm through which said spring acts.

8. In an internal combustion engine having an inlet passage for combustion air, a fuel pump, air regulating means for controlling the flow of air through said passage comprising two pivoted valves adapted to be opened by engine suction and opening toward each other, said valves having guides thereon, a spring carrier adapted to move on said guides toward or away from the axes about which the valves are pivoted, a spring in said carrier adapted to exert force on said valves to close them, pump regulating means for varying the quantity of fuel supplied to the engine and means for connecting the pump regulating means and the spring carrier so that movement of the pump regulating means to decrease the quantity of fuel supplied to the engine operates to move said carrier away from said axes whereby the moment arm through which said spring acts to close said valves is increased, the contour of the guides on said valves being such that said spring is compressed as the carrier is moved away from said axes.

9. Air regulating means for an internal combustion engine having an inlet passage for combustion air comprising two pivoted valves for controlling the flow of air through said passage, said valves being adapted to be opened toward each other by engine suction, means including a spring slidably mounted between said valves and adapted to exert a closing torque thereon, and control means for moving said spring toward and away from the axes about which said valves are pivoted to alter the effective moment arm through which said spring acts on said valves.

10. In an internal combustion engine having an inlet passage for combustion air, a pivoted valve for controlling the flow of air through said passage, said valve being adapted to be opened by engine suction, means including a spring for applying a variable closing torque to said valve, said means being movable in response to variations in the amount of fuel supplied to the engine to alter the torque applied through said spring by altering the moment arm through which the spring operates.

11. In an internal combustion engine having an inlet passage for combustion air, a pivoted valve for controlling the flow of air through said passage, said valve being adapted to be opened by engine suction, means including a spring for applying a variable closing torque to said valve, said means being movable in response to variations in the amount of fuel supplied to the engine to alter the torque applied through said spring by concurrently altering the tension of the spring and the effective moment arm through which the spring acts.

12. An internal combustion engine having a fuel pump, pump regulating means for controlling the amount of fuel supplied by the pump, an inlet passage for combustion air, air regulating means for controlling the flow of air through said passage comprising one or more pivoted valves adapted to be opened by engine suction, means for applying a variable closing torque, the value of which is determined by the position of the pump regulating means, to said air regulating means, and means to positively hold said air regulating means in open state in the position of the pump regulating means corresponding substantially to full engine load.

13. An internal combustion engine having a fuel pump, pump regulating means for controlling the amount of fuel supplied by the pump, an inlet passage for combustion air, air regulating means for controlling the flow of air through said passage comprising one or more pivoted valves adapted to be opened by engine suction, means under the control of said pump regulating means for applying a variable closing torque to the air regulating means and for positively maintaining the valves in open state in the position of the pump regulating means corresponding substantially to full engine load.

14. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow or air past the valve is substantially directly proportional to the amount of turning movement of the valve, said valve being adapted to be opened due to pressure of air admitted to said passage, and means comprising a spring for applying a closing torque to said valve, the value of which is determined by the position of said pump regulating means.

15. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow of air past the valve is substantially directly proportional to the amount of turning movement of the valve, said valve being adapted to be opened by air pressure acting on the valve, and means comprising a spring for applying a closing torque to said valve, the value of which is determined by the position of said pump regulating means and the value of which varies in substantially direct proportion to the amount of movement of said pump regulating means.

16. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow of air past the valve is substantially directly proportional to the amount of turning movement of the valve, said valve being adapted to be opened due to pressure of air admitted to said passage, and mechanism operatively connected to said pump regulating means including a spring for applying a closing torque to said valve, the value of which is determined by the position of said pump regulating means and means for positively holding said valve in fully open position when said pump regulating means is in a position providing fuel injection for substantially full engine load.

17. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow of air past the valve is substantially directly proportional to the amount of turning movement of the valve, said valve being adapted to be opened due to pressure of air admitted to said passage, and mechanism including a spring for applying a variable closing torque to said valve, said mechanism being movable in response to movement of said pump regulating means to alter the torque applied through said spring by altering the effective moment arm through which the spring acts on the valve.

18. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow of air past the valve is substantially directly proportional to the amount of turning movement of the valve, said valve being adapted to be opened due to pressure of air admitted to said passage, and mechanism including a spring for applying a variable closing torque to said valve, said mechanism being movable in response to movement of said pump regulating means to change the position of the spring relative to the valve so as to alter the torque applied through said spring by altering the effective moment arm through which it acts on the valve and said mechanism being movable to a position effecting positive full opening of said valve when the pump regulating means is adjusted for fuel injection corresponding to substantially full engine load.

19. An internal combustion engine comprising an inlet passage having an opening for admission of combustion air, a fuel pump, pump regulating means for controlling the amount of fuel supplied by the pump, air regulating means for controlling flow of air through said passage comprising a valve pivoted with respect to said opening so that variation in the size of the opening for flow of air past the valve is substantially directly proportional to the amount of turning movement of the valve, said valve being adapted to be opened due to pressure of air admitted to said passage, and mechanism for applying a variable torque to said valve including a spring and parts operatively connecting said spring and said pump regulating means for causing movement of the spring relative to said valve in response to movement of the pump regulating means, said mechanism being arranged so that when the pump regulating means is adjusted for fuel injection corresponding to substantially full load on the engine said spring acts to positively hold said valve in fully open position and when said pump regulating means is adjusted for fuel injection corresponding to relatively low engine loads said spring exerts a closing torque on said valve the value of which is determined by the position of the pump regulating means.

KNUT JONAS ELIAS HESSELMAN.